Patented Mar. 13, 1923.

1,448,245

UNITED STATES PATENT OFFICE.

MIGUEL LLOMPART Y VALDÉS AND VICENTE BACALLAO Y VILLAR, OF HABANA, CUBA.

LIQUID FUEL.

No Drawing.  Application filed November 14, 1921. Serial No. 515,082.

*To all whom it may concern:*

Be it known that we, MIGUEL LLOMPART Y VALDÉS and VICENTE BACALLAO Y VILLAR, both citizens of the Republic of Cuba, and residents of Habana, Cuba, have invented certain new and useful Improvements in a Liquid Fuel, of which the following is a specification.

This invention refers to a liquid combustible, and its purpose is to supply a combustible mixture specially adaptable to internal combustion engines. Its heating and dynamical efficiency is greater than that of the combustibles used now and produces in the explosion a high temperature and pressure which are maintained until the combustion is completed. Besides it has the advantages of producing light and aromatic residues free from acetic acid; of not promoting the formation of carbon in the cylinders; of being high rust protective and lubricant on account of its oleaginous and ethylic nature, thus tending to protect the engine organs; of being more economical than any of the other combustibles now used, and of not being dangerous, for it is not inflammable at the usual temperature.

This combustible is obtained by mixing in appropriate apparatus, at the convenient pressure and temperature, the following three ingredients which are products found in commerce—nitro-benzol, alcohol, preferably ethyl alcohol, and nitrous ether. These three substances are mixed in adequate proportions in order to form a homogeneous mixture. The proper proportions are as follows:—

Nitrobenzol _____ 00.75%
Ethyl alcohol _____ 99.00%
Nitrous ether _____ 00.25%

To this mixture is added a dye soluble in alcohol, such as the rosaniline or fuchsine hydrochlorate, the result being a liquid of greasy nature, scarlet red color, intense, penetrating and persistent odor similar to that of the bitter almonds, boiling at 80° C., and having a specific gravity of 0.80.

Having thus described our invention and the way in which it is produced, what we desire to cover by Letters Patent is all that may fall within the scope of the following claims:—

1. A liquid combustible constituted by nitro-benzol, alcohol and nitrous ether.

2. A liquid combustible constituted by nitro-benzol, ethyl alcohol and nitrous ether.

In witness whereof we affix our signatures.

MIGUEL LLOMPART Y VALDÉS.
VICENTE BACALLAO Y VILLAR.